United States Patent [19]
Rose et al.

[11] Patent Number: 5,447,786
[45] Date of Patent: Sep. 5, 1995

[54] SELECTIVE INFRARED LINE EMITTERS

[75] Inventors: Millard F. Rose; Peter L. Adair, both of Auburn, Ala.

[73] Assignee: Auburn University, Auburn, Ala.

[21] Appl. No.: 249,174

[22] Filed: May 25, 1994

[51] Int. Cl.$^6$ .......................... B32B 18/00; B32B 33/00
[52] U.S. Cl. ..................... 428/229; 428/225; 428/237; 428/240; 428/241; 428/255; 428/296; 428/409; 428/917; 501/64; 501/78; 501/904
[58] Field of Search ............... 428/225, 229, 237, 240, 428/241, 255, 296, 409, 917; 501/64, 78, 904

[56] References Cited

U.S. PATENT DOCUMENTS

| | | | |
|---|---|---|---|
| 4,584,426 | 4/1986 | Nelson | 136/246 |
| 5,080,963 | 1/1992 | Tatarchuk et al. | 428/225 |
| 5,096,663 | 3/1992 | Tatarchuk | 419/11 |
| 5,102,745 | 4/1992 | Tatarchuk et al. | 428/605 |

OTHER PUBLICATIONS

C. R. Parent and R. E. Nelson, "Thermovoltaic Energy Conversion with a Novel Rare Earth Oxide Emitter;" in *1986 Intersociety Energy Conversion Engineering Conference, San Diego, Calif., Aug. 25–29, 1986; Proceedings,* Paper 869299.

*Primary Examiner*—Patrick J. Ryan
*Assistant Examiner*—Richard P. Weisberger
*Attorney, Agent, or Firm*—Eugene I. Snyder

[57] ABSTRACT

Robust, large area selective infrared line emitters can be made using composites of rare earth metal compound particulates dispersed and interlocked in a network of connected structure-forming fibers having an emissivity less than about 0.1 in the range 0.7–5 microns. Articles where the composite is formed of rare earth metal oxide fibers in a network of sinter-bonded quartz fibers show narrow bandwidth emissions with good thermal conversion efficiencies.

22 Claims, 5 Drawing Sheets

SELECTIVE INFRARED LINE EMITTERS

The use of infrared heat sources for drying and enhancing chemical reactions in industrial processes is extensive. Typical industries which utilize infrared heating are the food, paper making, and textile industries; infrared heating is used as well as in electronic assembly lines and automotive paint drying. Infrared radiation is a secondary energy source; the primary energy source usually is fossil fuel whose energy of combustion (thermal energy) is ultimately converted to radiation in the infrared portion of the spectrum, although electrical energy also can be a primary energy source. Ancillary to energy conversion are several needs. The energy of combustion needs to be converted efficiently into infrared radiation. It also is desirable to have a narrow bandwidth of infrared radiation so that it may be utilized efficiently and selectively for the process in question. Closely related to this is the depth of penetration of infrared radiation which is desired in the particular processing step, since penetration depth is a function of wavelength. Two approaches to the latter would be to match the infrared emission to the detailed infrared absorption spectra for the process ingredients, or to dope the process constituents with inert materials having an absorption band matching the emitter. Our invention, and the subject matter of this application, relates to the conversion of thermal energy to infrared radiation of narrow bandwidth using robust, selective infrared line emitters. More particularly, our invention relates to composites, and their preparation, which serve as selective infrared line emitters but which, in contrast to prior art material, are structurally robust, i.e., are capable of maintaining their structural integrity at high temperatures and under conditions including moderate vibration and impact, and which can be readily formed into arbitrary shapes.

The principles underlying our invention are relatively well known within the theory of black-body radiation.[1] For a body in equilibrium with its environment the energy it emits must be equal to the radiation it is absorbing. Objects which are perfect absorbers of radiation are called ideal black-bodies and are approached by a cavity with insulating walls having a small orifice. When the cavity is heated the radiation it absorbs is an example of near-ideal black-body radiation; all real materials reflect part of the radiant energy incident upon them and emit less radiant energy than a black-body radiator at the same temperature. The total radiant power density from a black-body is given by the Stefan-Boltzmann equation as $$P = \sigma T^4$$

where P is the power density (in watts/m$^2$), $\sigma$ is the Stefan-Boltzmann constant, and T is the temperature in degrees Kelvin. For a non-black-body source, the above equation is modified by the hemispherical emissivity, $\epsilon$, according to the equation $P = \epsilon \sigma T^4$, where $\epsilon$ has a value between zero and one which accounts for the deviation from a perfect blackbody source. The distribution between the radiant power density and wavelength of radiation is given by the Planck equation as:

$$P_\lambda = a\lambda^{-5}[e^{b/\lambda T} - 1]^{-1}$$

in which $p_\lambda$ is the spectral power per m,$^2$ at the wavelength $\lambda$ and a, b are the first and second radiation constants, respectively.

[1] Black-body radiation occupies a prominent place in the development of modern, non-classical physics, for it was here that the first definite failure of the old wave theory of light was found. In deducing the mathematical form of the energy distribution in black-body radiation Max Planck (who had been urged to pursue a musical career since physics was described as a closed subject in which new discoveries were unlikely) introduced the notion of discontinuity of energy through the relation $E = h\nu$, where E is the energy quantum associated with an oscillator of frequency $\nu$ and h is Planck's constant.

Clearly the intensity of a given wavelength radiated by a block-body is a function of the temperature, and it is this temperature which also will determine the efficiency of selective line emitters. If the short wavelength cut-off of the black-body spectrum is at a wavelength longer than that required to excite a specific line radiator, there will be little or no emission from the sample. However, the intensity at a particular wavelength is exponential in temperature which should result in a strong temperature dependence for line emission. This in fact is what is observed. Certain rare earth oxides are theoretically capable of emitting as much as 70% of the total radiated energy at high temperature in a single line dependent upon the electronic structure of the material. At short wavelengths, in the ultraviolet region of their spectrum, these rare earth oxides tend to have high emissivity, but these modes are only excited efficiently at extremely high temperature. At the other end of the spectrum in the far infrared, there is little energy emitted even though there is high emissivity. Consequently, at the temperatures contemplated within this application the emissivity of these materials is effectively low except at the particular line frequency, or more correctly over a narrow bandwidth centered at the line frequency in question. As a result, the radiative characteristics of the rare earth oxides are narrow band emissions rather than a broad band continuum superimposed upon a line spectrum.

TABLE 1

Radiative Characteristics of Potential Rare Earth Emitters

| Element | Electronic Transition | Photon Energy (eV) | Bandwidth ($\Delta Eg/Eg$) | Maximum Efficiency (%) | Approximate Temp at Max. Eff. (K) |
| --- | --- | --- | --- | --- | --- |
| Yb | $^2F_{5/2} \rightarrow {^2F_{7/2}}$ | 1.29 | 0.18 | 70 | 3000 |
| Er | $^4I_{13/2} \rightarrow {^4I_{15/2}}$ | 0.83 | 0.05 | 55 | 2000 |
| Ho | $^5I_7 \rightarrow {^5I_8}$ | 0.62 | 0.10 | 72 | 1500 |
| Nd | $^4I_{13/2} \rightarrow {^4I_{9/2}}$ | 0.50 | 0.15 | 55 | 1400 |

The line emission from the elements should be at the following wavelengths respectively: Nd-2.5 microns; Ho-2.0 microns; Er-1.5 microns; Yb-0.95 microns. Note that some of these materials approach maximum efficiency at temperatures well within the range of those already in use in the industry. Theoretical analysis indicates that the optimum geometry for radiators is the form of a fiber or small particle with a thickness on the order of, or less than, the optical depth at the line frequency. (The "optical depth" is in this case defined as the depth where the probability that a quantum of energy, E, will be absorbed is 50%.) The advantage of thin fibers and small particles is in their small optical thickness. Small fibers and particles effectively limit off-band absorption and emission, characteristic of free carrier absorption and lattice defects. Prior measurement of emittance for some of the rare earth oxides at their characteristic wavelength indicates a value in the 0.4–0.6 range, suggesting that large area samples of such materials may be industrially useful.

The use of rare earth oxides as selective line emitters in energy conversion has been recognized for some time, especially in thermovoltaic conversion, i.e., the conversion of thermal to electrical energy, where the relatively efficient, narrow-band infrared emission of the rare earth oxides resulting from a high-temperature environment has been used as the radiation source for a photocell sensitive to the emission bandwidth. Although initial attempts to utilize the favorable properties of the rare earth oxides in thermovoltaic conversion were plagued by low efficiencies, little better than that of a pure black-body radiator, Nelson recognized that the problem was inherent to the monolithic ceramic structures used rather than to the oxides per se. C. R. Parent and R. E. Nelson, "Thermovoltaic Energy Conversion with a Novel Rare Earth Oxide Emitter;" in 1986 Intersociety Energy Conversion Engineering Conference, San Diego, CA, Aug. 25–29, 1986; Proceedings, Paper 869299. Using ceramic fibers Nelson was able to reduce the off-band radiation and thereby increase considerably the efficiency of energy conversion within the relatively narrow emission bandwidth.

Parent and Nelson made their fibrous emitters by impregnating cellulosic yarns with an ytterbium or erbium salt, and then applying controlled heat treatment to burn out the cellulosics and convert the salts to their oxides in a process reminiscent of the preparation of a Welsbach mantle. See U.S. Pat. No. 4,584,426 for a detailed description of the heat treatment. Although the foregoing represented a substantial advance in the utilization of rare earth oxides as selective infrared line emitters in energy conversion many limitations remained. In particular, the fibrous emitters described have limited mechanical strength, and because there is substantial (90%!) shrinkage of the preform during heat treatment fabrication of shaped articles is difficult if not impossible. What are needed are robust, large area samples of rare earth compounds, particularly the oxides, which can be fabricated as small fibers to efficiently convert thermal energy to infrared radiation. In this application we describe the fabrication of such materials and provide some initial data supporting the premise of their utility in industrial applications.

SUMMARY OF THE INVENTION

The purpose of this invention is to make available as articles of manufacture materials which efficiently convert thermal energy to narrow bandwidth emissions in the infrared portion of the spectrum. In one embodiment the selective infrared line emitters of our invention comprise a composite of rare earth metal oxide fibers interlocked in a network of sinter-bonded quartz fibers. In a more general embodiment the selective infrared line emitter is a composite of rare earth metal particulates dispersed and interlocked in a network of structure-forming fibers whose emissivity within the region of 0.7–5 microns is less than about 0.1 and whose network crossing points are joined by being sinter-bonded or friction-locked. Other more specific embodiments will be apparent from the ensuing discussion.

BRIEF DESCRIPTION OF THE FIGURES

FIG. 2 is for erbia, FIG. 3 for holmia, and FIG. 4 for neodymia.

DESCRIPTION OF THE INVENTION

Figure 1:
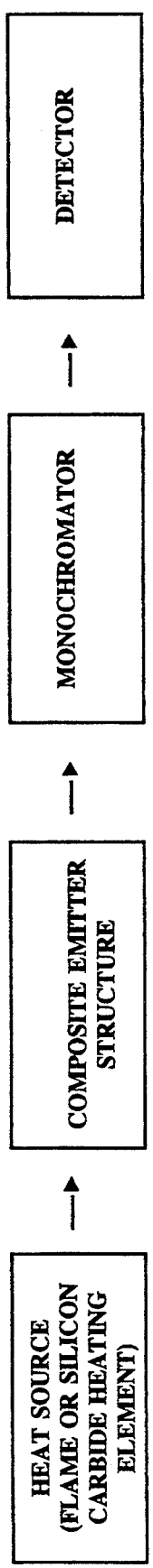
FIG. 1 is a block diagram of the experimental assembly used to measure the emission from the emitter surfaces.

The needs for conversion of thermal energy to other forms of energy are many and varied. Although solutions exist in principle, few are practical in the context of effecting energy conversion with good efficiency at commercially significant power levels. The use of materials which selectively emit narrow bandwidth infrared radiation upon thermal excitation affords a promise not heretofore met because the requisite structures were frail, easily damaged by impact or vibration, and of relatively low power. In this application we describe composites which are selective infrared line emitters and which can be readily shaped, molded, and scaled to afford robust articles capable of commercially significant power output. In some embodiments the articles of our invention ought to be capable of operation even at temperatures up to about 2500° C., the articles can be fabricated with a host of materials to "tune" the output frequency, and articles with multiple selective output frequencies in the infrared with relative intensities at each frequency suitable for a particular operation are eminently feasible.

The articles which are our invention are selective infrared line emitters and are a composite of rare earth metal compounds as particulates, especially as fibers, dispersed and interlocked in a network of structure-forming fibers having an emissivity less than about 0.1 over a broad range of wavelengths on either side of the peak emission, where the structure-forming fibers are connected at those crossing prints within the network where they are in contact either by sinter-bonding or by being friction-locked.

We use the term "network" in the usual dictionary definition, i.e., a structure of [cords or wires] that cross at regular intervals and are knotted or secured at the crossing. See Webster's Seventh New Collegiate Dictionary, G. & C. Merriam Co., (1970), page 568. We note that the networks of our invention are two dimensional in the sense that the flat-shaped article has a thickness generally small relative to the other lateral dimensions. However, the diameter of the largest of the structure-forming fibers also generally will be small relative to the thickness of the article, which means that the articles of our invention are not composed of a monolayer of fibers but instead are composed of multiple layers of discrete fibers. In the context of the definition of a network, the structure-forming fibers in our network may cross in different planes, consequently it follows that the fibers will not be in contact at all crossing points. In this application "junctions" refers to the crossing points in the network of structure-forming fibers where the latter are in contact with each other.

The purpose of the structure-forming fibers in our composite is to provide mechanical integrity and strength to the article, i.e., to provide an overall physical structure and framework to hold the radiating material in place. To achieve this the structure-forming fibers are connected at a multiplicity of their junctions, i.e., at those crossing points where the structure-forming fibers are in contact with each other. For the purpose of our invention the structure-forming fibers are connected by being either sinter-bonded or friction-locked. By "sinter-bond" is meant a fusion or welding together of the structure-forming fibers where they touch each other. This generally is effected by heat to the point where the structure-forming fibers just begin to diffuse sufficiently for fusion to occur at their junction. By "friction-lock" is meant an intermeshing of the structure-forming fibers which are held together by their mutually rough surfaces coming into contact and impeding one sliding over the surface of the other.

To be a structure-forming fiber in the context of this application the material needs to have certain definite properties, chief of which is a low emissivity, not more than about 0.1 within the range of 0.7–5 microns, which is the spectral range of interest. Material which has a low emissivity is not a good black-body radiator. Consequently, it will not dissipate a significant fraction of thermal energy as black-body radiation and allows more efficient conversion of thermal energy into selective infrared radiation. We note that smooth surfaces have a lower emissivity than do rough surfaces. Since rough surfaces are necessary for fibers to be friction-locked, it therefore follows that the use of friction-locking as a means of connecting to fibers is generally less favored than that of sinter-bonding in order for the article to have less of the undesirable black-body radiation.

Since the articles of our invention are contemplated to be used at temperatures generally in excess of 1,000° C., it follows that the structure-forming fiber must be oxidation resistant at elevated temperatures. These fibers also must be mechanically sound at high temperatures; it is self-evident that a fiber which melts at the temperatures contemplated for using the article will hardly suffice as a structure-forming fiber. It also is desirable that the structure-forming fibers have good thermal conductivity, at least as good as that of quartz (0.0064 cal/sec$^2$ cm$^{2}$°C./cm at 950° C.). Quartz fibers are our prime choice in many applications, both for their low emissivity and their transparency to the infrared radiation emitted by the other materials in the articles .of our invention. At temperatures above the melting point of quartz (approximately 1665° C.) one also can use materials such as platinum and, to a somewhat lesser extent, alumina, zirconia, Nextel 440, and other low emissivity ceramics. Although platinum is opaque, and therefore will not pass the infrared radiation being emitted by the article, it has the advantage of having a low emissivity when its surface is smooth. It is difficult to obtain alumina and other ceramics with an equally smooth surface, consequently their emissivity is somewhat higher than either quartz or platinum, and in this context they are less desirable as a structure-forming fiber than are either quartz or platinum.

The other components in our composites are infrared radiators. In a particularly important variant of our invention the other components are fibers of rare earth metal compounds. The latter materials share the common characteristic of having a line emission (i.e., a narrow bandwidth) in the infrared spectrum between about 0.7 and about 5 microns, arising from an electronic transition of an inner shell, non-valence electron. Because the electronic transition giving rise to the line emission arises from an inner shell electron, the wavelength or frequency of the line emission is a function solely of the rare earth metal, largely independent of both the particular rare earth compound and the oxidation state of the rare earth metal. Even though emissivities of various rare earth metal oxidation states and rare earth metal compounds may differ, it follows that different compounds of the same rare earth metal afford approximately the same line emission in the infrared.

The rare earth metals which may be used in the practice of our invention include cerium, praseodymium, neodymium, samarium, europium, gadolinium, terbium, dysprosium, holmium, erbium, thulium, ytterbium, and lutetium. Since the infrared emissions of interest here are stimulated at high temperatures, the rare earth metal compounds in the composite need to maintain their physical and structural integrity at high temperatures, especially in an oxidizing environment. Therefore the rare earth metal compounds of particular interest are the oxides, carbides, borides, and nitrides, and among these the oxides are of particular utility because of their broad availability. Among the rare earth metals whose compounds are preferred at this time in the practice of this invention are holmium, erbium, neodymium, and ytterbium.

The rare earth oxide fibers are readily formed merely by impregnating a high surface area fiber, serving as a template, with a rare earth nitrate or other suitable compound. The high surface area fiber is subsequently burned out or gasified under conditions where the rare earth compound impregnating the high surface area fiber is converted to the oxide. In particular, impregnation of a high surface area carbon followed by high temperature oxidation of the carbon template is particularly convenient. The resulting rare earth oxide fiber mimics the structure of the high surface area fiber with attending control of the size and surface area of the rare earth oxide fiber, which desirably enhances its emissivity. By "high surface area" is meant a surface area of at least 200 m$^2$/g, preferably at least 500 m$^2$/g, and even more desirably at least about 750 m$^2$/g. Carbon fibers with a surface area of over 1000 m$^2$/g have been used quite successfully.

The foregoing description was applicable to rare earth metal oxide fibers, but where the composite of our invention has rare earth metal nitride, carbide, or boride fibers the description is inapt. For the nitrides, carbides, or borides the fibers may be used directly, instead of being formed in sire.

The diameters of the fibers used in the practice of this invention are more dependent on commercial availability, ease of preparation, and cost than any theoretical or practical limitation. Small diameters are preferred for the rare earth metal compound fibers to minimize the effects of optical depth, i.e., to enhance optical properties, and to maximize the efficiency of line emission. Small diameters are preferred for the structure-forming fiber as well, both for strength and mechanical integrity of the composite. The diameters of the rare earth metal compound fibers are generally in the range of 5–30 microns, principally because of the availability of the carbon fibers used as the template in the oxide formation, but as with the structure forming fibers even smaller diameter rare earth oxide fibers are desirable. Ideally, rare earth oxide fibers in the 0.5–50 micron range would be most desirable ones. The diameter of the structure-forming fiber is quite dependent on the particular fiber, since commercial availability varies considerably. But it needs to be emphasized again that the method of preparation and attainment of the composites of our invention is not limited by fiber diameters, at least up to about 50 microns. It would be quite desirable to use structure-forming fibers with a diameter as low as about 0.5 microns, but again commercial availability generally limits their size to the 2–20 micron range. It also should be clear that because of the transparency of quartz to infrared emissions that its diameter is of far less consequence than that of an opaque structure-forming fiber such as platinum, for light scattering and reconversion of the infrared radiation to thermal energy both are undesirable. Once more we emphasize that smaller diameter structure-forming fibers are preferred but the diameters used are largely dictated by commercial availability.

The rare earth metal compounds may be present in the composites of our invention in an amount as low as about 1 weight percent up to as high as about 99 weight percent. There are obvious advantages to increased content of the rare earth metal compounds for greater energy conversion. However, for greater rigidity, greater resistance to vibration, and greater mechanical strength increasing amounts of structure-forming fiber are preferred. Consequently, the particular amounts of each that will be utilized in the composites of our invention depends sensitively on the application and can be readily determined by the skilled worker. On the other hand, this implies that the final composite can be tailored to the particular use envisioned, which is a substantial advantage of our invention. Where sinter bonding is used, the aspect ratio of the two kinds of fibers is of little, of any, practical consequence. Where friction-locking is the means of connecting the structure-forming fibers, a higher aspect ratio is favored over a lower aspect ratio.

The foregoing has been couched exclusively in terms of the rare earth metal compounds as fibers. However, more generally the composites of our invention can incorporate the rare earth metal compound as particulates. A great advantage of rare earth metal compounds as fibers is that in the resulting composite the fibers will be held more securely than other kinds of particulates. Consequently, particulates can be readily used subject to the proviso that they can be physically held within the composite and that the resulting composite structure retains integrity under conditions of use.

An important advantage of the composites of our invention is that they may be readily varied to afford selective infrared line emitters whose narrow bandwidth may be centered on a broad range of frequencies within the range of 0.7–5 microns simply by varying the rare earth metal. It also is possible to make composites with a combination of rare earths to afford selective infrared line emitters having more than 1 line emission in the infrared. By varying the ratio of the rare earth metal compounds in the composite it also is possible to vary the intensity of the different line emissions. All of the foregoing properties permit one to construct a selective infrared line emitter tailored for a particular process to ensure optimum utilization of the infrared emission.

Since the efficiency of various emitters varies with temperature, it follows that the nature of the structure-forming fiber may depend on the particular rare earth metal compound in the composite and the temperature at which the composite is contemplated to be used. In a similar way, the nature of the structure-forming fiber also may depend on the contemplated application of the composite.

The composites of our invention can be made by a relatively straight-forward, uncomplicated method generally applicable to many types of materials. The fibers, and other components where present, are dispersed in a fluid medium along with a binder. The resulting dispersion is then cast into a predetermined shape and the cast dispersion is heated at a temperature according to whether the structure-forming fibers are sinter-bonded at a plurality of their junctions or merely friction-locked. Substantially all of the binder is then removed, often as an incident to sinter-bonding. Our method is extraordinarily flexible and broadly applicable as to the kinds of fibers which may be used in its practice. It also exhibits virtual universality as to the resulting shape of the finished article, and in fact net-shaped or near net-shaped articles may be readily made, i.e., the shape and size of the finished article is very close to that of the cast dispersion prior to heating.

The structure-forming fibers and the rare earth metal compounds which may be used in this invention already have been adequately discussed, obviating the need for further description. The structure-forming fibers and the high surface area fibers serving as a template for rare earth oxide fiber formation are dispersed in a fluid medium, along with any other optional components, by suitable means. It is not essential to have an absolutely uniform dispersion, although often such uniformity is desirable. Dispersion may be effected by such means as sonication, agitation, ball milling, and so forth. The purpose of the liquid is merely to facilitate effective dispersion of the solids, especially where one wants as uniform a dispersion as is feasible in the final preform. Since the liquid is later removed it is clear that it should be readily removable, as by volatilization. Water is normally a quite suitable liquid, although water-alcohol mixtures, and especially water-glycol mixtures, may be used. Illustrative examples of other liquids include methanol, ethanol, propanol, ethylene glycol, propylene glycol, butylene glycol, poly(ethylene glycol)(s), poly(propylene glycol)(s), and so forth. Other organic liquids also may be used, but normally without any advantages. Since water is by far the most economical and most universally available liquid it is the one of choice in the practice of our invention. While some mixtures of the above noted liquids may be used to adjust the viscosity of the dispersion so that filtering or settling onto a screen or filter provides a certain degree of uniformity within the "wet" preform regardless of the densities and drag forces acting on the various particulates, still other additives including surfactants and dispersing agents can be used to assist in the mixing process. We emphasize again that the liquid functions only as a medium facilitating the dispersion of materials in preparing the preforms.

A preform is the solid containing a non-woven dispersion of the structure-forming fibers, the high surface area fibers serving as a template for the rare earth metal compounds, any other optional components, and binder. The binder provides a solid matrix in which the other components are dispersed. The purpose of the binder is to permit the fabrication of a solid preform of an otherwise structurally unstable dispersion of the elements of the final composite where the preform can be shaped, stored, and otherwise handled prior to creation of an interlocked network via sinter-bonding or friction-locking the structure-forming fibers at their junctions. The binder merely provides a stable, although relatively weak, physical structure which maintains the spatial relationship of the components of the final composite prior to the latter's formation. Although the preform is only a temporary structure, it is an important one in the fabrication of the final composite.

The binders are chosen to volatilize at least to the extent of 99 weight percent, under conditions which are neither chemically nor physically detrimental to other components in the final composite. The binder has no function in the final composite and may interfere with infrared emissions, consequently its presence should be minimized in the final composite. However, it can be used to control the composite's porosity for gas flow with a combustion flame as a heat source. Among the binders which may be used in the practice of this invention are cellulose, organic resins such as polyvinyl alcohol, polyurethanes, and styrene-butadiene latex, and thermosets such as epoxies, urea-formaldehyde resins, melamine-formaldehyde resins, and polyamide-polyamine epichlorohydrin resins. Cellulose, in all its forms and modifications, is by far the most desirable binder because it volatilizes completely at relatively low temperatures with little ash formation, is unreactive toward other components in the preform, and is readily available. In particular, the cellulosic materials typically used in the paper-making process are especially favored; the skilled worker will readily recognize the elements of the paper-making process in the foregoing description.

The binder is present in the preform at a range from about 2 to about 90 weight percent. The minimum amount of binder is that which is necessary to give a stable preform, that is, one which can be handled, shaped, and so forth, an amount which depends upon fiber and particulate loading, fiber size, and so forth. Using cellulose as a binder with quartz fibers and activated carbon fibers as the template for the rare earth metal oxides as an example, a range from about 10 to about 60 weight percent of cellulose in the preform is typical.

After the dispersion of components and binder in a liquid is attained, the solids are collected, as on a mat. Excess liquid may be removed, such as by pressing, and the resulting solid dispersion often is dried (i.e., liquid is removed), especially where it is to be stored prior to further treatment. Where a thermosetting binder is used, the temperature of drying is important. But in the more usual case there is nothing particularly critical in the drying process, and drying may be performed in air, under elevated temperatures, or in a flowing gas. The mass also may be compacted under pressure to a greater or lesser extent.

The dispersion may be cast into a predetermined shape prior to, coincident with, or after drying, with the last named procedure the one most commonly employed. The preform resulting from drying is generally quite flexible and adaptable to shapes of various sorts. Often it is quite convenient to cast the dispersion into sheets which can then be rolled up and stored prior to subsequent treatment. The sheets can be stored for long periods of time, can themselves be cast into near net-shaped bodies, and can be used on-site for the fabrication of various articles. Various types of preform sheets may be stacked upon one another to create thicker composites. Alternatively, different shaped preform sheets may be stacked so as to form both two and three dimensional structures for various application.

The preform or the cast dispersion is heated to remove the binder and, where necessary, to sinter-bond the structure-forming fibers at their junctions. The preform is heated under conditions effecting sintering of the structure-forming fibers to provide a network of fused or sinter-bonded fibers. Fusion of the fibers at their points of contact rigidly locks the structure-forming fibers in place to afford a rigid structure by defining a matrix of the high surface area fibers serving as a template intertwined and interlocked in a network of structure-forming fibers with the structural rigidity arising from a multiplicity of fused points at the contact sites of the structure-forming fibers. Although the nature of the materials in the preform are important to determine the particular fusion conditions, the relative amounts of these materials are less important. The optimum sintering temperature can be routinely determined by the skilled worker in this field through simple experimentation. For example, where a quartz fiber-rare earth metal oxide composite is obtained via a quartz fiber—carbon fiber preform with cellulose as a binder it has been determined that fusion temperatures from about 1400° C. to about 1450° C. for a period from 5 to 30 minutes appear to represent optimum conditions.

After removal of the binder the resulting matrix of structure-forming fibers and high surface area fibers is soaked in a solution of a suitable rare earth metal compound to impregnate the high surface area fibers; the final amount of the rare earth oxide is determined by the concentration of this solution. The matrix is dried and then heated to oxidize the high surface area fiber and to convert the rare earth metal compound to a solid oxide which mimics the large surface area fiber.

The following illustrates our invention. Examples are merely representative of but a few of the embodiments of our invention, all of which are encompassed by our claims.

EXPERIMENTAL

Radiator Fabrication

The fundamental prerequisite for selected line emitters according to our application is that they must be strong enough to maintain their physical integrity under the contemplated conditions of use. The composite radiators of our invention are easy to fabricate, capable of fabrication in any geometry, may be made as large area emitters, and are relatively inexpensive. The basic fabrication of our emitters is analogous to that described in U.S. Pat. Nos. 5,080,963, 5,096,663, and 5,102,745, with significant additions applicable to the unique materials requirements placed on selected emitters. Standard paper making techniques are used. A preliminary form of the radiator consists of a suitable high surface area fiber serving as a template for forming the rare earth oxide, cellulose, and quartz fibers which have been blended and made into a standard sheet of paper. By using this technique, highly uniform sheets can be made which can be molded into any form while still wet. When dry the foregoing is then annealed at a high temperature in an inert atmosphere to remove the cellulose and to sinter-bond the quartz fibers while maintaining the presence of the high surface area fibers. The sinter-bonding provides an excellent mesh which effectively holds the radiating material in place as well as providing structural strength. Quartz is ideal and can be purchased in a number of sizes. After sinter-bonding, the resulting matrix is soaked with a solution of a suitable rare earth compound and subsequently heated at a temperature sufficient to gasify, e.g., the carbon used as the high surface area fiber and to convert the rare earth metal compound to its oxide. By varying the constituents, thick paper can be made to the point of being essentially optically opaque over a wide range of wavelengths. We have used this technique to produce robust radiators from materials including erbium, ytterbium, holmium, and neodymium oxides. A representative, detailed description follows.

Activated carbon fibers and quartz fibers of diameter 8–12 microns were cut into lengths from ⅛" to about ½". The length can vary depending upon the paper-making equipment and desired application; for example, longer fibers yield better friction-locking. A mixture of 2 grams of cut quartz fibers, 2 grams of activated carbon fibers, and 1 gram of ashless filter paper (the cellulosic paper for binder purposes), sufficient to afford an 8"×8" square of paper a couple of millimeters thick, were added into a blender along with about 500 mL of water to promote mixing. The blender was turned on and the mixture stirred well for about 5 minutes to afford a homogeneous slurry. This slurry then was poured into a sheet mold containing an additional 5 L water and the mold was slowly agitated. Excess water was drained through a wire screen with a porosity large enough to allow water yet small enough so that the composite constituents were trapped and formed a wet paper. This wet paper was placed on a dryer to remove excess water. At this point in the process the paper may be molded while still wet into any desired shape and subsequently dried to afford a shaped preform. The dried paper preform subsequently was placed into a controlled atmosphere furnace and the furnace environment was purged with an inert gas, such as argon. The furnace temperature was raised to a temperature of about 1440° C. to sinter-bond the quartz while maintaining a constant flow of inert gas. During heating the cellulose gasifies; a temperature of 1440° C. is maintained for at least about 30 minutes to sufficiently sinter-bond the quartz. Subsequently the temperature is lowered to 1140° C. for one hour to permit the quartz fibers to anneal in a constant flow of inert gas. After the resulting material attains room temperature it is soaked with a saturated solution of a rare earth metal nitrate and subsequently allowed to dry. The dried composite is then heated to about 1000° C. in air or oxygen in order to convert the nitrate(s) into oxide(s) and to gasify the activated carbon. The resultant composite emitter is a robust emitter which contains a sinter-bonded structural material and a selectively emitting rare earth metal oxide.

Experimental Setup

FIG. 1 is a block diagram of the experimental assembly used to measure the emission from the emitter surfaces. We have constructed the apparatus to allow both a combustion and electrical heat source. In order to make accurate efficiency measurements, it would be desirable to heat the samples electrically, where the input power to the heating element must be equal to the power radiated from the surface plus any losses due to convection and conduction. For more accurate measurements it may be desirable to conduct measurements in a vacuum with long cylindrical samples where end effects would be negligible.

For our test setup, we thermally heated the composite emitter structures via a combustion flame source or by flowing current through a silicon carbide heating element. The composite emitters were molded into a cylindrical tube shape in order to maximize the thermal coupling to the silicon carbide heating element. The composite emitters, in the form of a tube, could also then be placed in the flow of a combustion flame to be thermally excited. When heated, the spectral content of the composite emitter output was determined by using a Jarrell Ash Quarter Meter Ebert Monochromator which contained a diffraction grating with a 295 grooves per millimeter ruling and a 2.1 micron blaze. A thermopile detector was placed at the exit slit of the monochromator to determine the relative amount of radiation at each wavelength. A thermopile detector was used because of its uniform absorption over a wide range of wavelengths. The power impinging upon the detector head at each scanned wavelength was then logged using a data recorder.

Results and Discussion

Figure 2:
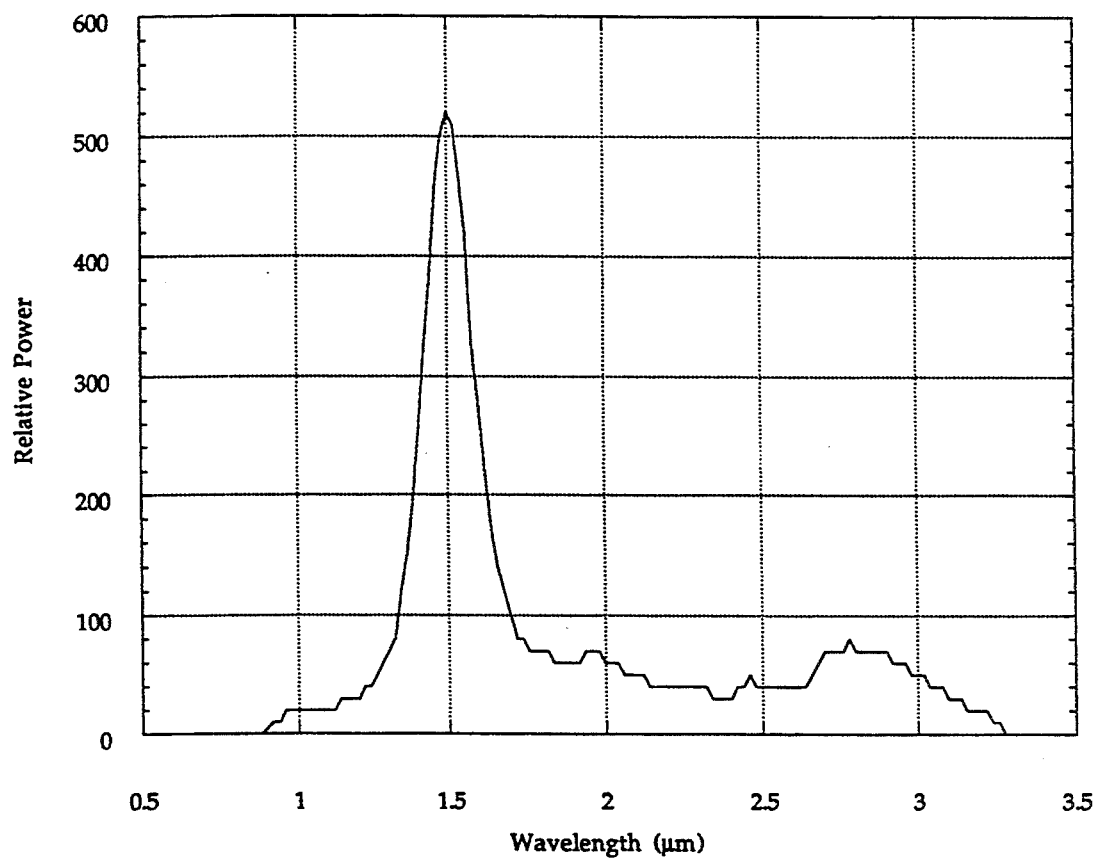
FIGS. 2–4 are emission spectra of rare earth oxide composite emitters heated with a combustion flame.
Figure 3:
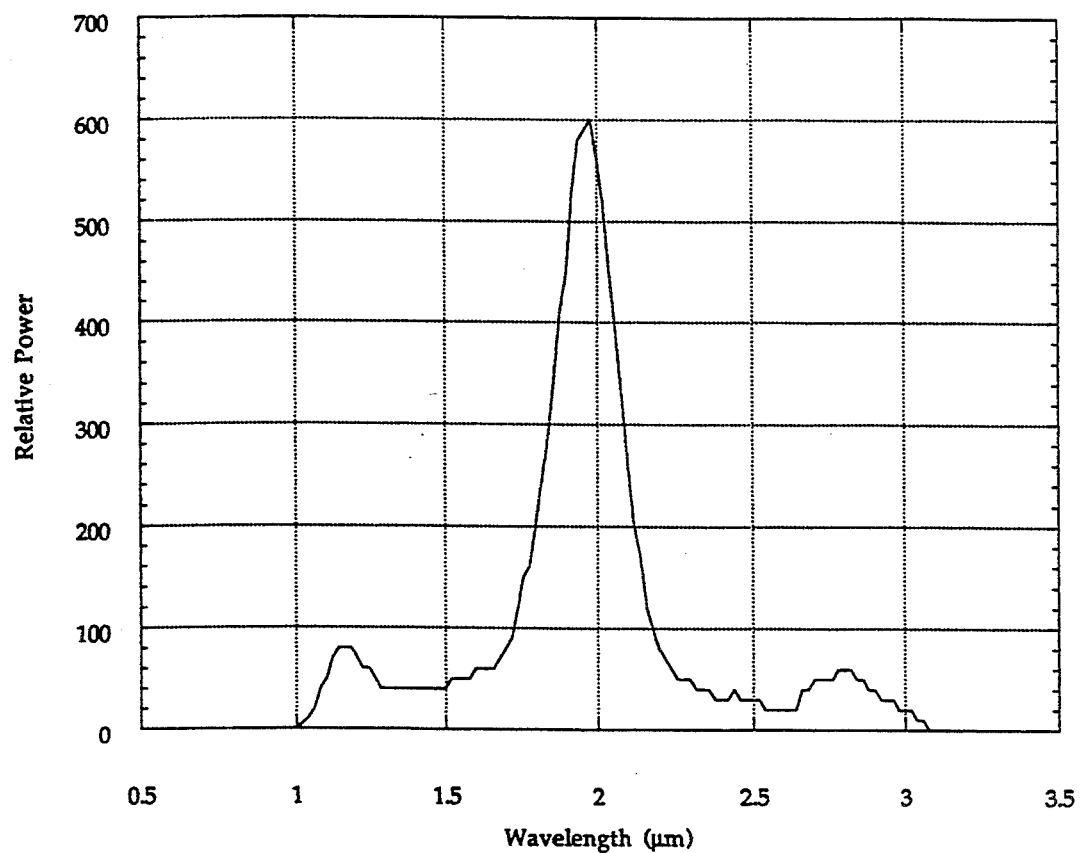
Figure 4:
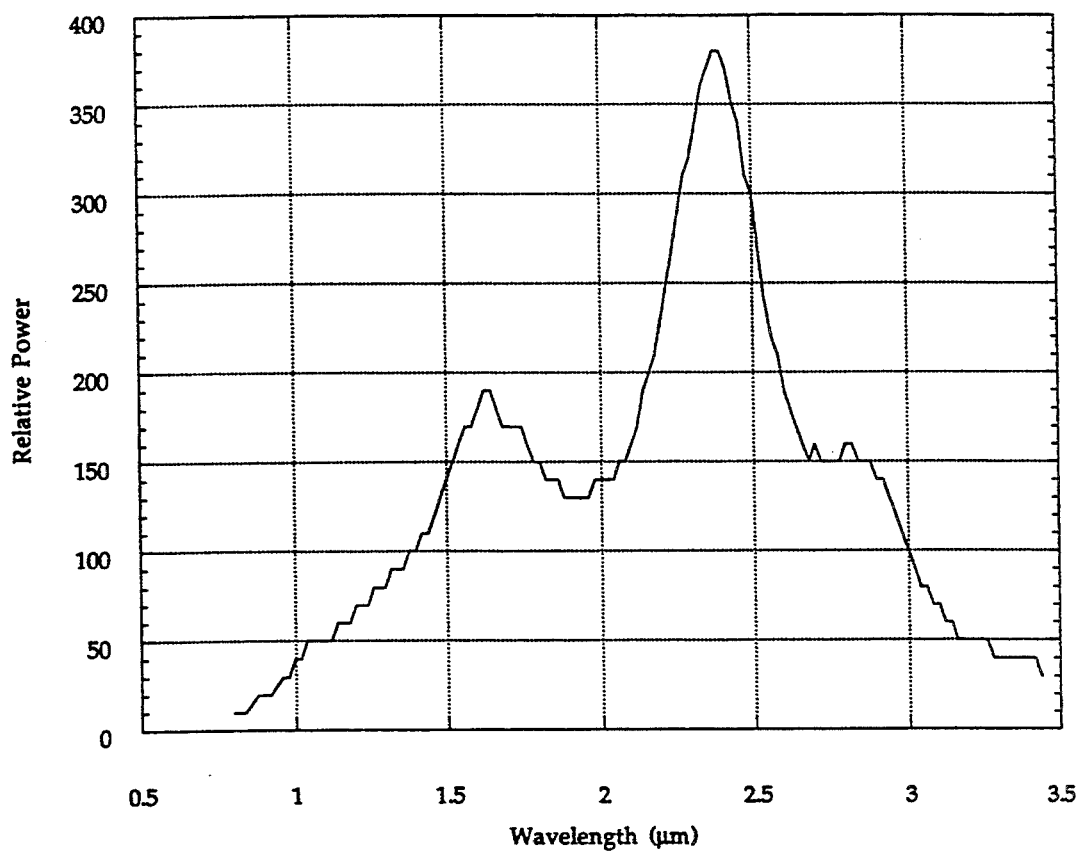
Figure 5:
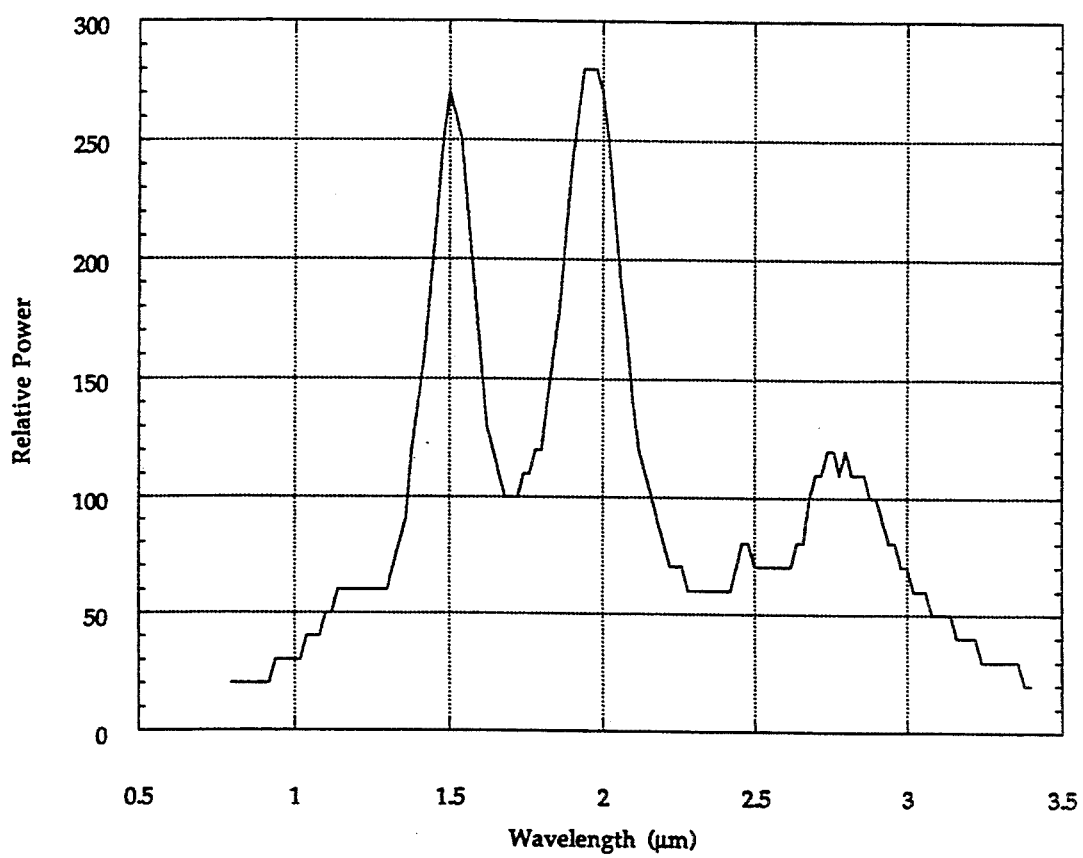
FIG. 5 is the output spectrum of an erbia/holmia composite emitter.

The basic technique for fabricating the composites of our invention allows the construction of a homogeneous, moldable structure from components which normally are incompatible. Our laboratory method can easily afford "mantle" structures containing rare earth oxides which are robust enough to make cylindrical structures 1" in diameter and 8" long. They are easily handled and have survived dropping to the floor in the process of changing mantles. This is of interest because rare earth oxides are very brittle and fragile in nature and cannot be used in large area emitters without the structural support of some type of reinforcing material such as quartz fibers. The strength is governed by the appropriate heat treatment of the mantle and the ratio of the constituents. We believe that strong mantles can be made in most geometries and with surface areas of several square feet. We have observed radiation from mantles excited both electrically and with combustion heat sources. FIGS. 2-4 portray the results of the rare earth oxide composite emitters when heated with a combustion flame. Note that for holmia the peak to background ratio is 6:1 and the bandwidth at half maximum is 400 nanometers. Also noteworthy is the fact that all of the composite emitters have line emissions corresponding to the values listed in Table 1 with significant peak to background ratios. A wide bandwidth may be good for thermophotovoltaic applications from the perspective of cell output power design. Under certain circumstances, it may be desirable to broaden the emission profile or to have radiation at two distinct wavelengths. The technique described above is readily adaptable to producing "two line" emitters. FIG. 5 is the output spectrum of an erbia/holmia composite emitter.

In an attempt to construct an experimental arrangement which would allow accurate characterization of efficiency, an electrically heated unit was constructed. The silicon carbide heating element was powered by the laboratory main through a variac power controller. In this manner, the heating element should be capable of achieving temperatures of 1500 K. Our first experiments with this assembly have resulted in the expected line emission but superimposed upon the line emission is a black-body like spectrum which manages to penetrate the mantle and is characteristic of the silicon carbide heating element. Thicker emitter structures should effectively eliminate that problem. A small peak occurs at the predicted wavelength of the rare earth oxide but black-body radiation penetrates the fibrous mantle structure lowering the peak to background ratio.

What is claimed is:

1. A selective infrared line emitter comprising a nonwoven composite of fibers of at least one rare earth metal oxide dispersed and interlocked in a network of sinter-bonded quartz fibers having an emissivity of not more than about 0.1 within the range of 0.7–5 microns.

2. The selective infrared line emitter of claim 1 where the rare earth metal is selected from the group consisting of ytterbium, erbium, holmium, and neodymium.

3. The selective infrared line emitter of claim 1 where the rare earth metal oxide is ytterbium oxide.

4. The selective infrared line emitter of claim 1 where the rare earth metal oxide is erbium oxide.

5. The selective infrared line emitter of claim 1 where the rare earth metal oxide is holmium oxide.

6. The selective infrared line emitter of claim 1 where the rare earth metal oxide is neodymium oxide.

7. The selective infrared line emitter of claim 1 where the rare earth metal oxide fibers and the quartz fibers have a diameter between about 0.5 and about 50 microns.

8. The selective infrared line emitter of claim 7 where the quartz fiber has a diameter between about 2 and about 20 microns.

9. The selective infrared line emitter of claim 7 where the rare earth oxide fibers have a diameter between about 5 and about 30 microns.

10. An article of manufacture which is a selective infrared line emitter comprising a nonwoven composite of a) particulates of at least one rare earth metal compound having selective line emissions in the infrared within the wavelength region of 0.7 to about 5 microns dispersed and interlocked in b) a network of structure-forming fibers, said fibers having an emissivity within said wavelength region of less than 0.1, said network having junctions where said fibers are in contact, where a multiplicity of said junctions are connected by the fibers being sinter-bonded or friction-locked.

11. The article of manufacture of claim 10 where the particulates are fibers.

12. The article of manufacture of claim 11 where the structure-forming fibers are selected from the group consisting of quartz, platinum, alumina, zirconia, Nextel 440, and any combination thereof.

13. The article of manufacture of claim 10 where the structure-forming fiber is quartz connected by being sinter-bonded.

14. The article of manufacture of claim 10 where the structure-forming fiber is platinum connected by being sinter-bonded.

15. The article of manufacture of claim 10 where the structure-forming fiber is alumina connected by being friction-locked.

16. The article of manufacture of claim 10 where the rare earth metal is selected from the group consisting of holmium, erbium, ytterbium, neodymium, and any combination thereof.

17. The article of manufacture of claim 10 where the rare earth metal compound is selected from the group consisting of oxides, carbides, borides, nitrides, and combinations thereof.

18. The article of manufacture of claim 17 where the rare earth metal compound is an oxide.

19. The article of manufacture of claim 10 where the rare earth metal compound constitutes from about 1 up to about 99 weight percent of the article of manufacture.

20. The article of manufacture of claim 10 where the structure-forming fiber has a diameter from about 0.5 up to about 50 microns.

21. The article of manufacture of claim 20 where the structure-forming fiber has a diameter from about 2 up to about 20 microns.

22. The article of manufacture of claim 11 where the fibers of the rare earth metal compound are from about 0.5 up to about 50 microns.

* * * * *